(12) United States Patent
Neves Creto et al.

(10) Patent No.: US 11,604,891 B2
(45) Date of Patent: Mar. 14, 2023

(54) DISPLAYING SENSITIVE CONTENT BASED ON WHETHER OTHERS ARE AROUND USER

(71) Applicant: Motorola Mobility LLC, Chicago, IL (US)

(72) Inventors: Alexandre Neves Creto, São Paulo (BR); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 778 days.

(21) Appl. No.: 16/514,769

(22) Filed: Jul. 17, 2019

(65) Prior Publication Data

US 2021/0019441 A1    Jan. 21, 2021

(51) Int. Cl.
| | |
|---|---|
| *G06F 21/62* | (2013.01) |
| *G06F 3/14* | (2006.01) |
| *H04W 4/14* | (2009.01) |
| *G06F 21/40* | (2013.01) |
| *G06F 21/32* | (2013.01) |
| *G06F 1/3296* | (2019.01) |
| *H04L 51/224* | (2022.01) |

(Continued)

(52) U.S. Cl.
CPC ........ *G06F 21/6245* (2013.01); *G06F 1/3296* (2013.01); *G06F 3/14* (2013.01); *G06F 21/32* (2013.01); *G06F 21/40* (2013.01); *H04L 51/224* (2022.05); *H04W 4/14* (2013.01); *G06V 40/1365* (2022.01); *G06V 40/172* (2022.01); *G06V 40/197* (2022.01); *G06V 40/70* (2022.01); *H04B 1/385* (2013.01); *H04B 1/3833* (2013.01)

(58) Field of Classification Search
CPC ...... G06F 21/6245; G06F 21/40; G06F 21/32; G06F 3/14; G06F 1/3296; H04W 4/14; H04L 51/224
USPC .......................................................... 726/30
See application file for complete search history.

(56) References Cited

U.S. PATENT DOCUMENTS

| | | | |
|---|---|---|---|
| 9,066,125 B2 * | 6/2015 | Sands .............. | H04N 21/42201 |
| 10,043,014 B1 * | 8/2018 | Hadsall .................. | G06V 10/10 |

(Continued)

FOREIGN PATENT DOCUMENTS

WO    WO-2017165523 A1 *   9/2017    ............... G06F 3/02

OTHER PUBLICATIONS

"Notice of Allowance", U.S. Appl. No. 16/548,640, dated May 2, 2022, 17 pages.

(Continued)

*Primary Examiner* — Samson B Lemma
(74) *Attorney, Agent, or Firm* — FIG. 1 Patents

(57) ABSTRACT

A sensitive content display control system determines whether to display sensitive content on a computing device display, such as on a lock screen. The system attempts to authenticate a user of the computing device, and does not display the sensitive content if the user is not authenticated. If the user is authenticated, then the system determines whether anyone in addition to the user is looking at the computing device display. If the user is authenticated and no one else is looking at the computing device display, then the sensitive content is displayed. However, if the user is authenticated and at least one additional person is looking at the computing device display, then the sensitive content is not displayed.

20 Claims, 7 Drawing Sheets

(51) Int. Cl.
*H04B 1/3827* (2015.01)
*G06V 40/70* (2022.01)
*G06V 40/16* (2022.01)
*G06V 40/18* (2022.01)
*G06V 40/12* (2022.01)

(56) References Cited

U.S. PATENT DOCUMENTS

| | | | | |
|---|---|---|---|---|
| 10,165,108 B1* | 12/2018 | Douglas | ............ | G06Q 30/0262 |
| 10,395,128 B2* | 8/2019 | Van Os | ............ | H04N 5/23222 |
| 10,484,384 B2* | 11/2019 | Cotterill | ............ | G06F 21/36 |
| 10,496,808 B2* | 12/2019 | Van Os | ............ | G06F 21/84 |
| 10,503,935 B1* | 12/2019 | Hadsall | ............ | G06V 10/10 |
| 10,620,794 B2* | 4/2020 | Cotterill | ............ | G06F 3/0483 |
| 11,287,942 B2* | 3/2022 | Han | ............ | H04W 12/06 |
| 11,443,053 B2 | 9/2022 | Creto | | |
| 11,494,046 B2* | 11/2022 | Han | ............ | H04L 63/0861 |
| 2003/0135288 A1 | 7/2003 | Ranganathan et al. | | |
| 2014/0282965 A1* | 9/2014 | Sambamurthy | ............ | G06F 21/32 726/7 |
| 2015/0079943 A1 | 3/2015 | Williams | | |
| 2018/0101715 A1 | 4/2018 | Lee et al. | | |
| 2019/0080189 A1* | 3/2019 | Van Os | ............ | G06V 40/166 |
| 2020/0234027 A1* | 7/2020 | Han | ............ | H04L 63/0815 |
| 2021/0209206 A1 | 7/2021 | Li et al. | | |

OTHER PUBLICATIONS

"Non-Final Office Action", U.S. Appl. No. 16/548,640, dated Jan. 6, 2022, 13 pages.

"Restriction Requirement", U.S. Appl. No. 16/548,640, dated Oct. 29, 2021, 11 pages.

"Corrected Notice of Allowability", U.S. Appl. No. 16/548,640, dated Aug. 2, 2022, 3 pages.

* cited by examiner

DISPLAYING SENSITIVE CONTENT BASED ON WHETHER OTHERS ARE AROUND USER

BACKGROUND

As technology has advanced, people have become increasingly reliant upon a variety of different computing devices, such as wireless devices (e.g., wireless phones or smartwatches). While these computing devices offer a variety of different benefits, they are not without their problems. One such problem is that computing devices oftentimes display content in response to various events, such as receipt of a text message from another user. Frequently, this content is displayed automatically by the computing device, resulting in the content being visible to other people near the computing device. Unfortunately, this can lead to sensitive content (e.g., messages the user of the computing device desires to keep private) being visible to various people other than the user of the computing device. This ability for other people to view sensitive content can lead to user dissatisfaction and frustration with their computing devices.

BRIEF DESCRIPTION OF THE DRAWINGS

Embodiments of displaying sensitive content based on whether others are around user are described with reference to the following drawings. The same numbers are used throughout the drawings to reference like features and components.

DETAILED DESCRIPTION

Figure 1:
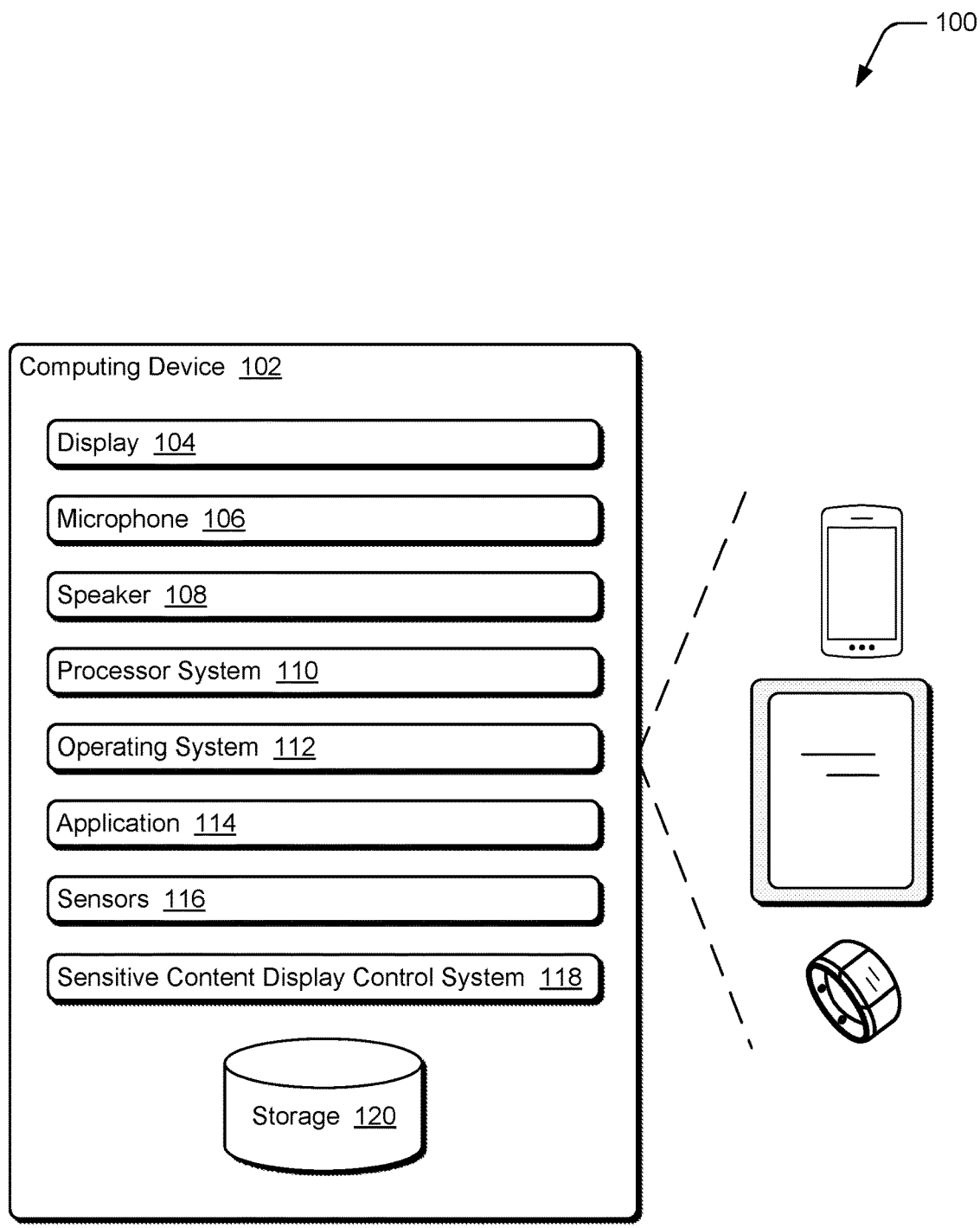
FIG. 1 illustrates an example computing device implementing the techniques discussed herein.

Displaying sensitive content based on whether others are around user is discussed herein. Generally, the techniques discussed herein authenticate a user of a computing device, determine whether anyone in addition to the user is looking at the computing device, and determine whether to display sensitive content based on that authentication and determination. The sensitive content is displayed, for example, on a lock screen of the computing device. The sensitive content can take various different forms, such as messages (e.g., text messages, pictures, emails, etc.) that are displayed to the user.

More specifically, a sensitive content display control system determines whether a user is present at the computing device display. If no one is present at the computing device display, then the sensitive content display control system does not display sensitive content at the computing device. However, if a user is present at the computing device display, then the sensitive content display control system determines whether the user is an authorized user of the computing device. The sensitive content display control system makes this determination by using one type of authentication mechanism, such as a biometric authentication mechanism (e.g., such as a face recognition mechanism, an iris recognition mechanism, a voice recognition mechanism, and so forth), a fingerprint authentication mechanism, and so forth.

If the user present at the computing device display is not an authorized user of the computing device, then the sensitive content display control system does not display sensitive content at the computing device. However, if the user present at the computing device display is an authorized user of the computing device, then the sensitive content display control system determines whether there are any people in addition to the user that are able to view the computing device display. The sensitive content display control system can determine whether there are any people in addition to the user that are able to view the computing device display in various different manners, such as based on image capture, audio capture, thermal sensors, proximity sensors, and so forth.

If there are no people in addition to the user that are able to view the computing device display, then the sensitive content display control system displays sensitive content at the computing device. However, if there are people in addition to the user that are able to view the computing device display, then the sensitive content display control system does not display sensitive content at the computing device.

The sensitive content display control system displays a lock screen on which the sensitive content can be displayed. In one or more embodiments, the computing device operates in a low power mode in which only a certain portion of the display is activated when displaying the lock screen. For example, pixels in only a portion of the display are activated so that the sensitive content (if displayed), a current time and date, and one or more user-selectable icons are displayed. If the user chooses to unlock the computing device (e.g., via entry of a fingerprint or password), then the computing device transitions to a higher power mode in which all of the display is activated.

The techniques discussed herein improve security of sensitive content and provide a seamless user experience in viewing the sensitive content. If sensitive content is to be displayed (e.g., a text message is received) and someone picks up the computing device (e.g., a smartphone), the sensitive content is displayed only if the person that picks up the computing device is an authorized user of the computing device and there are not any other people in addition to the user that are able to view the computing device display. If the user desires to view the sensitive content despite others possibly being able to view the sensitive content, the user can unlock the computing device and view the sensitive content.

FIG. 1 illustrates an example computing device 102 implementing the techniques discussed herein. The computing device 102 can be many different types of computing or electronic devices. For example, the computing device 102 can be a smartphone or other wireless phone, a notebook computer (e.g., netbook or ultrabook), a laptop computer, a wearable device (e.g., a smartwatch), a tablet or phablet computer, a personal media player, an Internet of Things (IoT) device, an automotive computer, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores or multiple processors (each having one or more cores).

The computing device 102 also includes an operating system 112. The operating system 112 manages hardware, software, and firmware resources in the computing device 102. The operating system 112 manages one or more applications 114 running on the computing device 102, and operates as an interface between applications 114 and hardware components of the computing device 102.

The computing device 102 also includes one or more sensors 116. A variety of different types of sensors 116 can be included in the computing device 102, such as a thermal sensor, a proximity sensor, an image capture device (e.g., a camera), an active IR sensor, a passive IR sensor, and so forth.

The computing device 102 also includes a sensitive content display control system 118. The sensitive content display control system 118 authenticates a user of the computing device 102 as well as determines whether anyone in addition to the user is able to view the display 104, and determines whether to display sensitive content based on this authentication and determination. The sensitive content can take various different forms, such as text, pictures, other images or video, and so forth.

The sensitive content can be identified in a variety of different manners. In one or more embodiments, the sensitive content is identified based on the source of the content (e.g., an application 114 or a program of the operating system 112). Some applications or programs provide sensitive content to the sensitive content display control system 118 to display, and others do not. For example, music playback applications, sports applications displaying scores and updates, weather applications, and so forth do not provide sensitive content to display, whereas messaging applications, email applications, and social media applications do provide sensitive content to display. Optionally, the application or program providing the content to the computing devices 118 for display indicate whether the content is sensitive content. A user input specifying which applications or programs provide (or do not provide) sensitive content can also be received by the sensitive content display control system 118.

Additionally or alternatively, whether content is sensitive content can be based on a sender of the content. The sender of the content refers to an originator of the content, such as user sending an email or instant message, a user posting an update on a social media platform, and so forth. An application or program provides this content to the sensitive content display control system 118 for display. Some senders (as identified by a sender identifier, such as a name, email address, account identifier, etc.) do not provide sensitive content whereas other senders do provide sensitive content. For example, senders that are family members or business contacts provide sensitive content but senders that are news organizations or advertisers to not provide sensitive content. A user input specifying which senders provide (or do not provide) sensitive content can also be received by the sensitive content display control system 118.

Additionally or alternatively, whether content is sensitive content can be based on the content itself. Various rules or criteria can be used to indicate whether content is sensitive content, such as identification of particular keywords or phrases in the content that indicate that the content is sensitive content (or not sensitive content). A user input specifying these rules or criteria can also be received by the sensitive content display control system 118.

In one or more embodiments, the sensitive content refers to notifications (e.g., text or images) that are provided by various applications or programs. These notifications can include, for example, notifications of received emails messages (e.g., the notification is at least a portion of the email message), notifications of received instant messages (e.g., the notification is at least a portion of a short message service (SMS) message or multimedia messaging service (MMS) message), notifications of received social media updates (e.g., the notification is at least a portion of the social media update) and so forth. Whether the notifications are sensitive content can be determined in various manners as discussed above. For example, notifications from messaging applications, email applications, and social media applications are sensitive content, but notifications from music playback applications, sports applications, and weather applications, are not sensitive content.

The sensitive content display control system 118 optionally displays notifications on a lock screen of the computing device 102. The lock screen refers to a screen that the computing device 102 displays with a limited amount of information on it, and from which the user can provide authentication information (e.g., a personal identification number (PIN), a password, etc.) to unlock and gain full access to the computing device 102. The information displayed on the lock screen can include, for example, one or more of the current time, the current date, a battery charge level, and notifications provided by various applications or programs.

The computing device 102 can optionally operate in multiple different power modes, including at least a low power mode and a higher power mode. Various different power conserving techniques can be used in the low power mode, such as activating or powering only a portion of the display 104 to be able to display data (e.g., only the area on the display 104 where notifications are displayed), deactivating or powering down certain processors or processor cores, deactivating or powering down certain sensors 116, and so forth. In the higher power mode, one or more of these power conserving techniques are reversed (e.g., the entire display 104 is activated or powered on, processors or processor cores are activated or powered on, certain sensors 116 are activated or powered on, and so forth.

The sensitive content display control system 118 can be implemented in a variety of different manners. For example, the sensitive content display control system 118 can be implemented as multiple instructions stored on computer-readable storage media and that can be executed by the processor system 110. Additionally or alternatively, the sensitive content display control system 118 can be implemented at least in part in hardware (e.g., as an application-specific integrated circuit (ASIC), a field-programmable gate array (FPGA), and so forth).

The computing device 102 also includes a storage device 120. The storage device 120 can be implemented using any of a variety of storage technologies, such as magnetic disk, optical disc, Flash or other solid state memory, and so forth. The storage device 120 can store various program instructions and data for the operating system 112, application 114, or sensitive content display control system 118.

Figure 2:
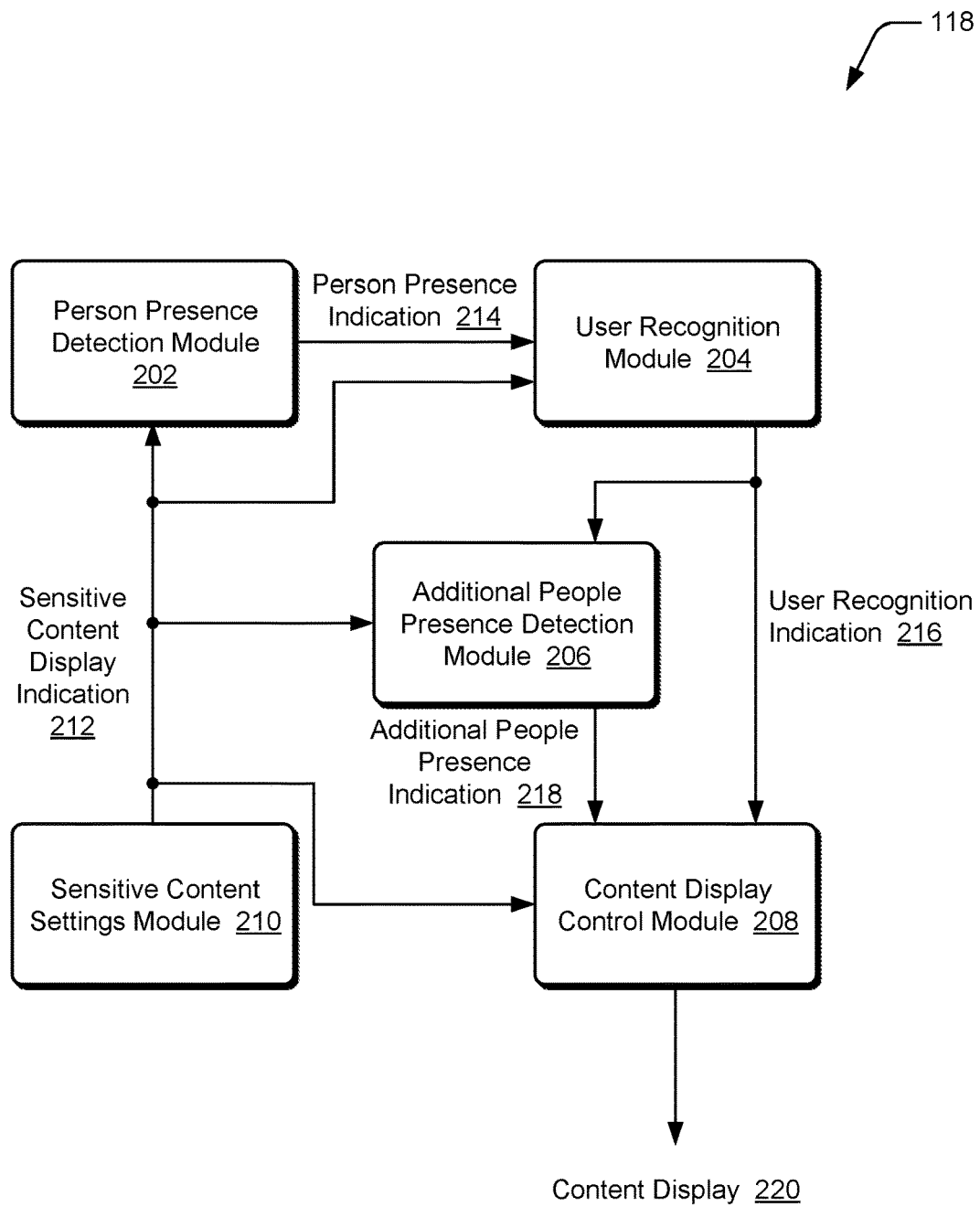
FIG. 2 illustrates an example sensitive content display control system in accordance with one or more embodiments.

FIG. 2 illustrates an example sensitive content display control system 118 in accordance with one or more embodiments. The sensitive content display control system 118 includes a person presence detection module 202, a user recognition module 204, an additional people presence detection module 206, a content display control module 208, and a sensitive content settings module 210

The sensitive content settings module 210 provides a sensitive content display indication 212 to one or more of the modules 202, 204, 206, and 208. The sensitive content settings module 210 receives a user input indicating whether sensitive content is to be hidden at the computing device 102, and an indication of this user input is provided as the sensitive content display indication 212. In response to a user input requesting to hide sensitive content, the modules 202, 204, 206, and 208 operate to hide sensitive content based on whether other people are around an authenticated user as discussed in more detail below. Other user inputs can also be received, such as a user input requesting to show all content (in which case the modules 202, 204, 206, and 208 do not operate to hide sensitive content), or a request to show no content (in which case the modules 202, 204, 206, and 208 operate to display no content regardless of whether the content is sensitive content).

Figure 3:
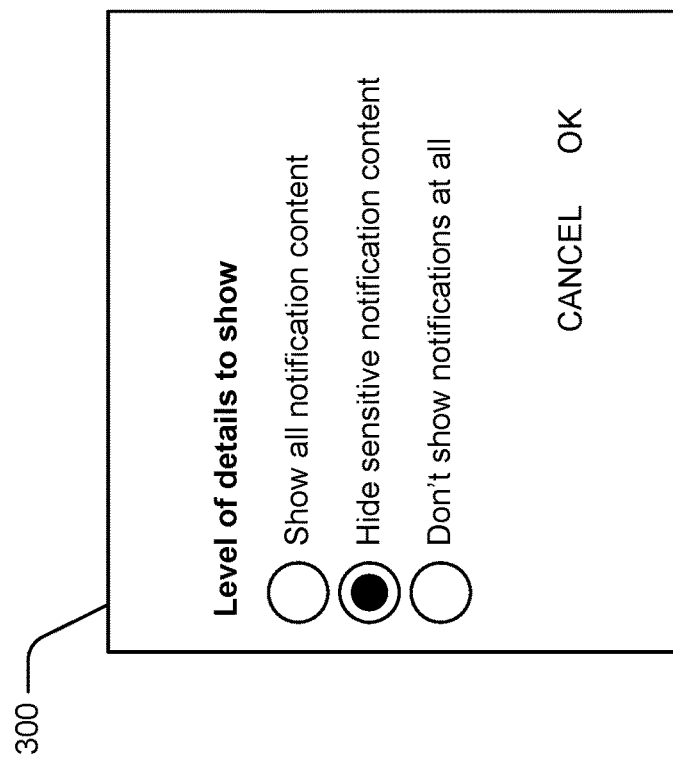
FIG. 3 illustrates an example user interface via which user inputs indicating whether sensitive content is to be hidden can be received.

FIG. 3 illustrates an example user interface 300 via which user inputs indicating whether sensitive content is to be hidden can be received. With the example user interface 300 a user can specify what notifications are to be displayed on a lock screen of the computing device 102. Multiple content display options are displayed in the user interface 300 with radio buttons allowing the user to select one display option. The display options include "Show all notification content", user selection of which causes the sensitive content display control system 118 to display all notifications on the lock screen (and not hide sensitive content). The display options also include a "Hide sensitive notification content", user selection of which causes the sensitive content display control system 118 to hide sensitive content (in this example the sensitive content is notifications). The display options also include a "Don't show notifications at all", user selection of which causes the sensitive content display control system 118 to display no notifications on the lock screen (regardless of whether the notifications are sensitive content).

Returning to FIG. 2, the person presence detection module 202 implements functionality to determine whether a user is present at the display 104 of the computing device 102. The person presence detection module 202 can rely on various different sensors and apply any of a variety of different public or proprietary techniques to determine whether a user is present at the display 104. In one or more embodiments, the person presence detection module 202 uses an IR sensor to detect a person in front of the display 104. The person presence detection module 202 provides a person presence indication 214 to the user recognition module 204 indicating whether the person presence detection module 202 determined that a user is present at the display 104.

The user recognition module 204 implements functionality to, in response to the person presence indication 214 indicating that a user is present at the display 104, attempt to authenticate the user. The user recognition module 204 activates a camera (e.g., an image capture device that is a sensor 116), which can be a front-facing camera (e.g., so person's face is visible to the camera when the user is looking at the display 104), a 360-degree camera, and so forth.

The user recognition module 204 determines whether the user present at the display 104 is an authorized user of the computing device 102. An authorized user of the computing device 102 refers to a user that is deemed by the computing device 102 as being permitted to access the computing device 102 (e.g., a user having an account on the computing device 102, a user that is an owner of the computing device 102, and so forth). The user recognition module 204 can use any of a variety of public or proprietary techniques to authenticate the user, such as face recognition, iris recognition, voice recognition, fingerprint recognition, other biometric authentication techniques, and so forth.

In one or more implementations, the user recognition module 204 authenticates the user by performing face recognition using an image capture device and depth sensor. Using face recognition (or other types of biometric authentication, such as iris recognition) allows the user recognition module 204 to authenticate the user by having the user simply look at the display 104. The user need not input any additional voice or manual inputs to the computing device 102. Rather, the user can simply look at the computing device 102 and the sensitive content display control system 118 automatically determines that a user is looking at the computing device 102 and that the user is an authorized user of the computing device 102.

The user recognition module 204 outputs a user recognition indication 216 indicating whether the user is an authorized user of the computing device 102. The user recognition indication 216 is provided to both the additional people presence detection module 206 and the content display control module 208.

The additional people presence detection module 206 implements functionality to determine whether there are one or more additional people (people other than the user) present at the computing device 102, and whether those additional people are looking at the display 104. In one or more implementations, the additional people presence detection module 206 determines whether there are one or more additional people present at the computing device 102 in response to the user recognition indication 216 indicating that the user is an authorized user of the computing device 102 and the sensitive content display indication 212 indicating whether sensitive content is to be hidden at the computing device 102. The additional people presence detection module 206 can determine whether there are one or more additional people present at the computing device 102 in various different manners, such as based on image capture, audio capture, thermal sensors, proximity sensors, and so forth.

If there no additional people present at the computing device 102, then the additional people presence detection module 206 outputs the additional people presence indication 218 indicating that there are not one or more additional people present at the computing device 102. However, if there is at least one additional person present at the computing device 102, then the additional people presence detection module 206 uses one or more additional sensors to determine whether the additional one person is looking at the display 104. The additional people presence detection module 206 then outputs the additional people presence indication 218 indicating the result of that determination. Thus, the additional people presence detection module 206 uses a multi-level detection technique to determine whether there are any additional people present at the computing device 102 and that are looking at the display 104. Using this multi-level detection technique allows the computing device 102 to conserve power by not activating or powering on certain sensors unless used to perform the later stage.

The additional people presence detection module 206 uses one or more of various different sensors to determine whether one or more additional people are present at the computing device 102. In one or more embodiments, the additional people presence detection module 206 captures audio (e.g., from the microphone 106) at the computing device 102. The additional people presence detection module 206 uses any of a variety of public or proprietary techniques to analyze the captured audio and determine whether multiple users' voices are captured. If multiple users' voices are captured then there are one or more additional people present at the computing device 102. However, if multiple users' voices are not captured then there are not one or more additional people present at the computing device 102.

Additionally or alternatively, the additional people presence detection module 206 uses proximity sensors to determine whether multiple people are present at the computing device. Proximity sensors detect how many objects that may be people are in close proximity to the computing device 102. For example, thermal sensors that detect the presence of objects with a human temperature within a particular range, such as 6-10 feet, can be used to determine whether multiple people are present at the computing device.

If there is at least one additional person present at the computing device 102, then the additional people presence detection module 206 uses one or more additional sensors to determine whether the additional one person is looking at the display 104. In one or more embodiments, these additional sensors are an image capture device, such as a front-facing camera (a camera that can capture images of people looking at the display 104), a 360-degree camera, and so forth. The additional people presence detection module 206 uses any of a variety of public or proprietary techniques to analyze the captured image(s) and determine whether multiple users are looking at the display 104. For example, the additional people presence detection module 206 identifies whether multiple faces are looking at the display 104, whether more than two eyes are looking at the display 104, and so forth. If the captured image(s) from the front-facing view of the computing device 104 includes multiple faces or more than two eyes, then the additional people presence detection module 206 determines that there are one or more additional people (in addition to the authenticated user) looking at the computing device display 104.

The additional people presence detection module 206 outputs an additional people presence indication 218 indicating whether there are one or more additional people looking at the display 104. Optionally, the additional people presence indication 218 also indicates whether there are one or more additional people present at the computing device 102 (regardless of whether those one or more additional people are looking at the display 104).

The content display control module 208 implements functionality to determine whether to display sensitive content. The content display control module 208 displays content 220 as appropriate based on the sensitive content display indication 212 and the determination of the content display control module 208 regarding whether to display sensitive content.

The content display control module 208 determines whether to display sensitive content based on the user recognition indication 216 and, in certain circumstances, the person presence indication 218. In response to the user recognition indication 216 indicating that the user is not an authorized user, the content display control module 208 does not display sensitive content. In response to both the user recognition indication 216 indicating that the user is an authorized user and the additional people presence indication 218 indicating that there are one or more additional people looking at the display 104, the content display control module 208 hides the sensitive content. The content display control module 208 hides the sensitive content by, for example, not displaying the sensitive content. However, the content display control module 208 optionally displays an indication that sensitive content for display exists (e.g., an indication that a notification has been received, an indication of the type of notification (e.g., notification of an email, instant message, social media update, etc.) is optionally displayed). In response to both the user recognition indication 216 indicating that the user is an authorized user and the additional people presence indication 218 indicating that there are not one or more additional people looking at the display 104, the content display control module 208 displays the sensitive content.

In one or more embodiments, the sensitive content display control system 118 determines whether to display sensitive content in response to a user being present at the display 104. Furthermore, the sensitive content display control system 118 can repeat this determination at various intervals or in response to various different events. For example, at regular or irregular intervals the sensitive content display control system 118 can again determine whether to display sensitive content, including determining whether a user is present at the display 104, determining whether a user present at the display 104 is an authorized user, and determining whether additional people are looking at the display 104. The sensitive content display control system 118 then displays content 220 in accordance with the newly made determinations.

Repeating these determinations allows the sensitive content display control system 118 to adapt to changes. For example, the sensitive content display control system 118 may initially determine that no other people are looking at the display 104, so sensitive content is displayed. However, if the sensitive content display control system 118 subsequently determines that one or more additional people are looking at the display 104, the sensitive content is then hidden. By way of another example, the sensitive content display control system 118 may initially determine that one or more additional people are looking at the display 104, so the sensitive content is hidden. However, if the sensitive content display control system 118 subsequently determines that no other people are looking at the display 104, sensitive content is then displayed.

The user recognition module 204 determines whether the user present at the display 104 is an authorized user of the computing device 102. Detecting that the user present at the display 104 is an authorized user results in allowing sensitive content to be displayed by the content display control module 208 in certain circumstances as discussed above. In one or more embodiments, this authentication of the user does not unlock the computing device 102. Rather, an additional authentication is performed using different authentication information and the computing device 102 is unlocked if this additional authentication indicates the user present at the display 104 is an authorized user of the computing device 102. This additional authentication can be performed by the user recognition module 204 or another system or module of the computing device 102 (e.g., a program included in the operating system 112).

Once the computing device 102 is unlocked the user has full access to the computing device 102. Sensitive content can be displayed without regard for whether other people are looking at the display 104. The sensitive content display control system 118 assumes that if the user unlocks the computing device 102 that the user is aware of his or her surroundings and is comfortable having whatever content he or she desires displayed. Additionally, in one or more embodiments the computing device 102 transitions from the low power mode to a higher power mode in response to being unlocked. In the higher power mode one or more power conserving techniques implemented in the low power mode are reversed as discussed above.

Two different authentication mechanisms are used to authenticate a user: one is used to allow sensitive content to be displayed by the content display control module 208 in certain circumstances as discussed above, and the other is used to unlock the computing device 102. Each authentication mechanism uses different authentication information (e.g., images, audio, fingerprints, alphanumeric inputs, and so forth). For example, the authentication mechanism to allow sensitive content to be displayed by the content display control module 208 may be a face recognition system that uses images of faces to authenticate the user, an iris recognition system that uses images of eyes to authenticate the user, and so forth. The authentication mechanism to unlock the computing device 102 may be a fingerprint recognition system that uses scanned fingerprints to authenticate the user, a password or PIN verification system that uses alphanumeric inputs to authenticate the user, and so forth.

The techniques discussed herein provide a convenient and easy way to allow users to keep sensitive content on their computing devices private. For example, assume a device owner's computing device is sitting on a table or counter and a notification that is sensitive content is received from an application or program (e.g., a text message from the owner's wife). If the owner picks up the computing device and no one else is looking at the computing device display, then the notification that is sensitive content is displayed. However, if someone else picks up the computing device, or the owner picks up the computing device and one or more other people can see the computing device display, then the notification that is sensitive content is not displayed.

FIGS. 4-8 each illustrate example user interfaces that may be displayed by the computing device 102 using the techniques discussed herein. In the examples of FIGS. 4-8, the computing device is operating in a low power mode in which certain portions of the computing device display are powered or activated. Those portions are the portions in which the status information, selectable items (e.g., icons, buttons), and notifications (or indications of hidden contents) are displayed.

Figure 4:
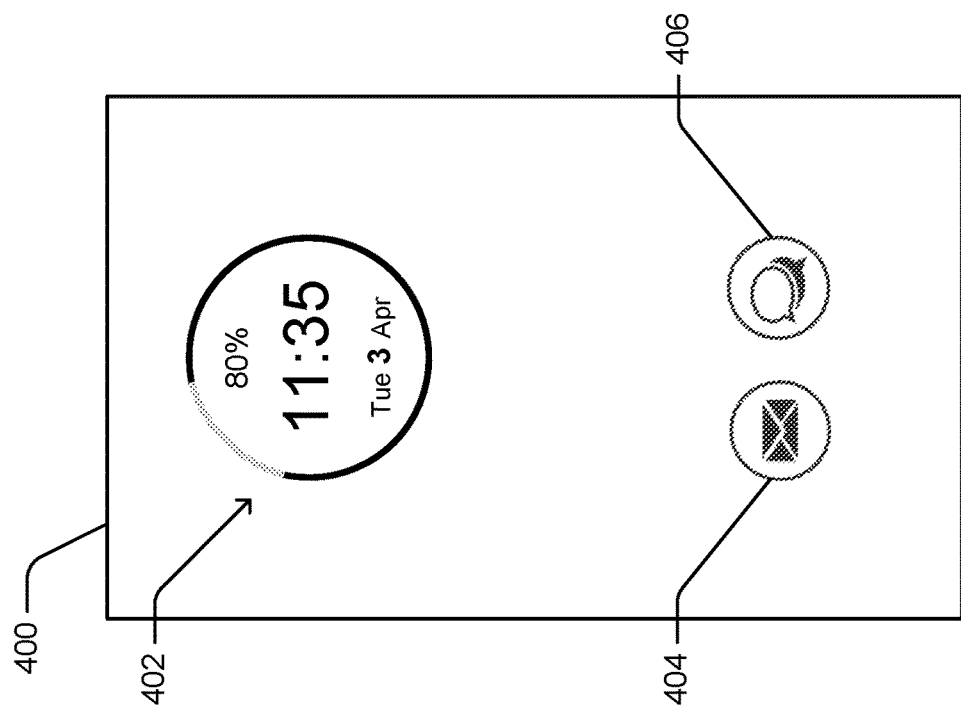
FIGS. 4, 5, 6, 7, and 8 each illustrate example user interfaces that may be displayed by the computing device using the techniques discussed herein.

FIG. 4 illustrates an example lock screen 400. The lock screen 400 includes a status display portion 402, which displays a current time, date, and an indication of battery life remaining. The lock screen 400 also includes a mail icon 404 that is selectable to allow email notifications to be displayed, and a messaging icon 406 that is selectable to allow messaging (e.g., text messaging) notifications to be displayed. The mail icon 404 and the messaging icon 406 can each be displayed in two different manners, one indicating that a notification is ready to be displayed and another indicating that a notification is not ready to be displayed. For example, the messaging icon 406 can be displayed brighter, in a different color, animated, and so forth if a messaging notification is ready to be displayed.

Figure 5:
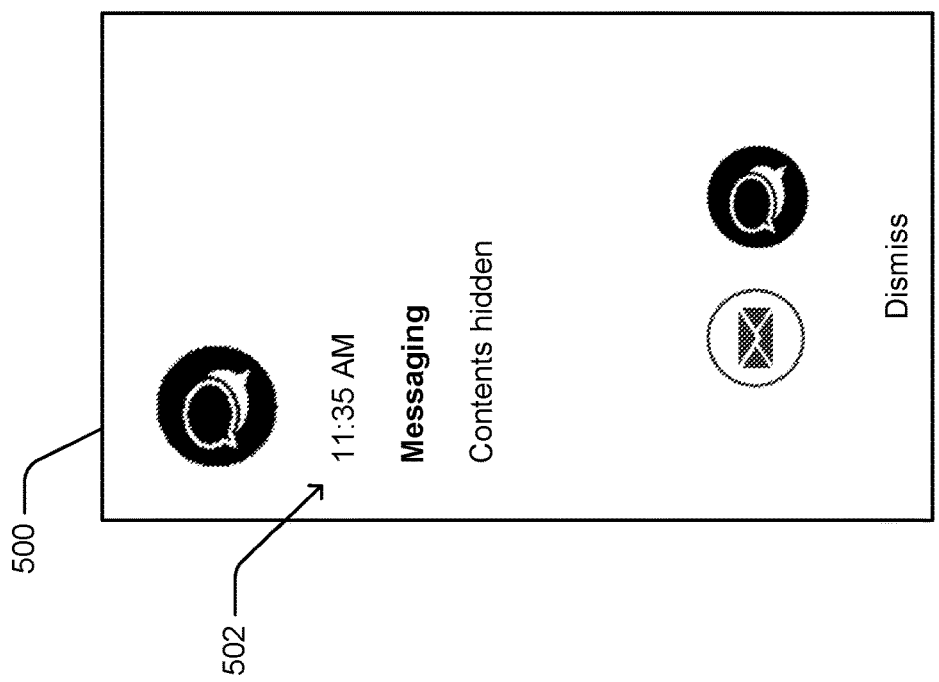

FIG. 5 illustrates an example lock screen 500. The lock screen 500 is displayed in response to user selection of the messaging icon 406 on the lock screen 400 as well as the user not being an authorized user of the computing device (or the user recognition module 204 being in the process of authenticating the user). An indication 502 is displayed indicating that sensitive content is not being displayed.

Figure 6:
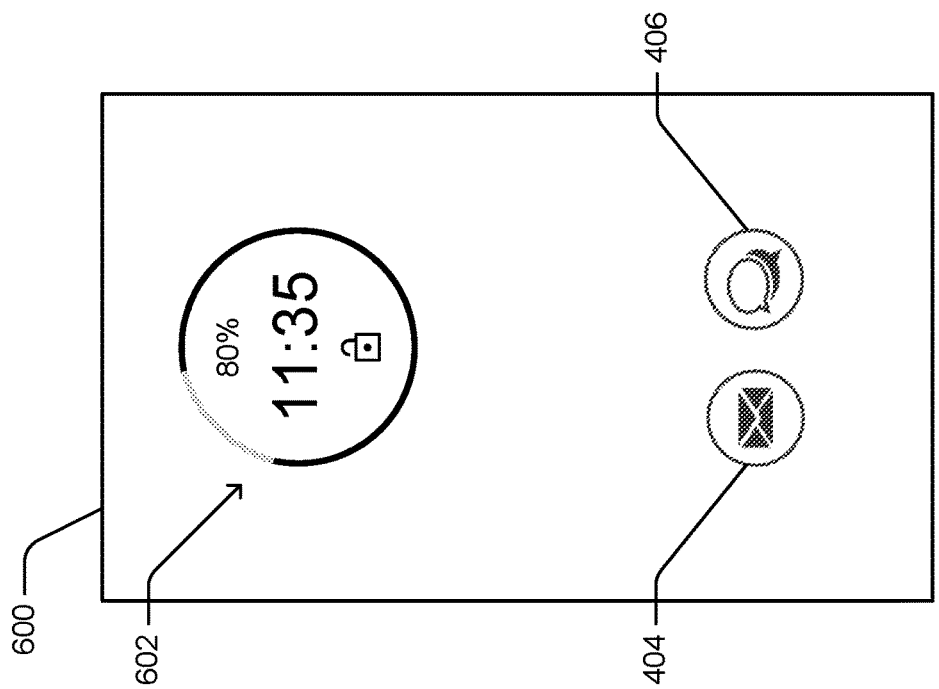

FIG. 6 illustrates an example lock screen 600. The lock screen 600 is similar to the lock screen 400 of FIG. 4, but is a lock screen 600 displayed in response to a user having been authenticated by the user recognition module 204. The lock screen 600 includes a status display portion 602, which displays a current time and an indication of battery life remaining. The status display portion 602 also displays an indication (shown as an open padlock) that the user has been authenticated by the user recognition module 204 and that one or more additional people looking at the computing device display have not been detected. This informs the user that, for example, he or she can select one of the icons 404 or 406 and have sensitive content displayed.

Figure 7:
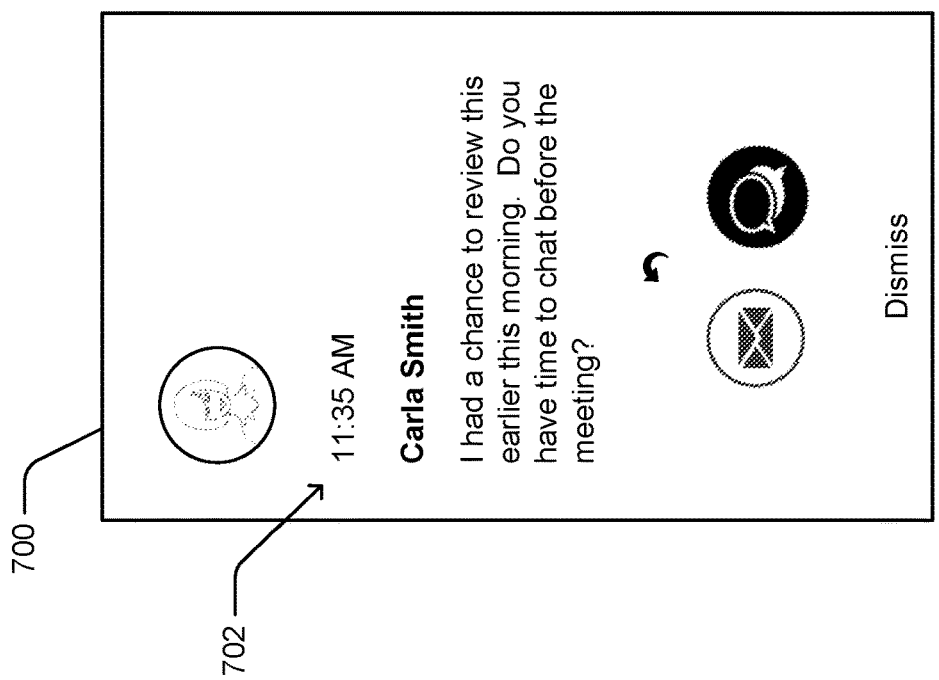

FIG. 7 illustrates an example lock screen 700. The lock screen 700 is displayed in response to user selection of the messaging icon 406 on the lock screen 400 or 600 as well as the user being an authorized user of the computing device and one or more additional people looking at the computing device display not having been detected. The messaging notification 702 is displayed because the user is an authorized user of the computing device and one or more additional people looking at the computing device display have not been detected.

Figure 8:
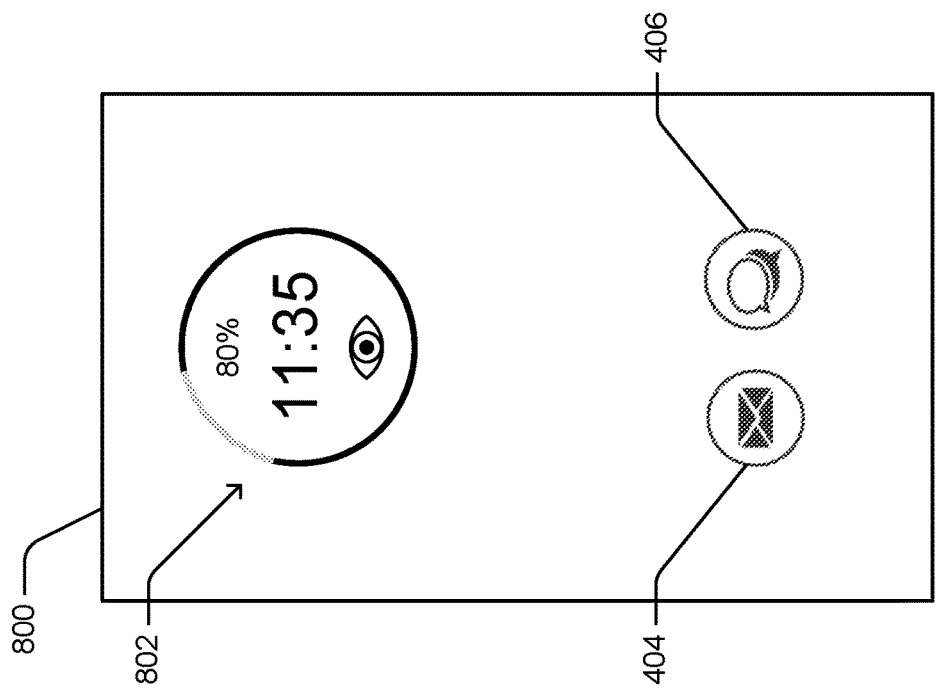

FIG. 8 illustrates an example lock screen 800. The lock screen 800 is similar to the lock screen 400 of FIG. 4, but is a lock screen 800 displayed in response to a user having been authenticated by the user recognition module 204. The lock screen 800 includes a status display portion 802, which displays a current time and an indication of battery life remaining. The status display portion 802 also displays an indication (shown as an eye) that the user has been authenticated by the user recognition module 204 but that one or more additional people looking at the computing device display have been detected. This informs the user that, for example, sensitive content will not be displayed. If the user were to select one of the icons 404 or 406, a lock screen is displayed indicating that sensitive content is not being displayed (e.g., the lock screen 500 of FIG. 5).

Figure 9:
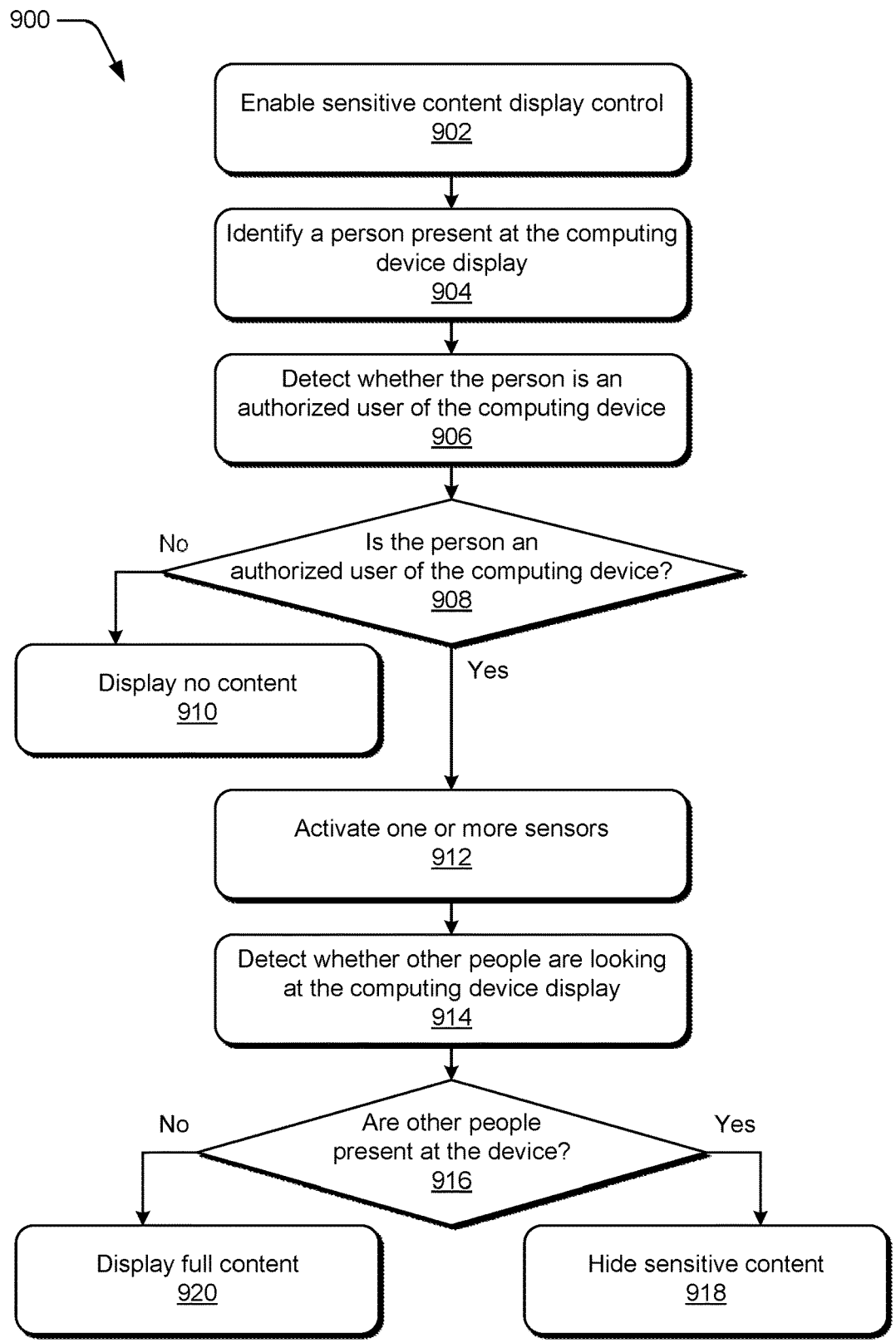
FIG. 9 illustrates an example process for implementing the techniques discussed herein in accordance with one or more embodiments.

FIG. 9 illustrates an example process 900 for implementing the techniques discussed herein in accordance with one or more embodiments. Process 900 is carried out by a sensitive content display control system, such as the sensitive content display control system 118 of FIG. 1 or FIG. 2, and can be implemented in software, firmware, hardware, or combinations thereof. Process 900 is shown as a set of acts and is not limited to the order shown for performing the operations of the various acts.

In process 900, sensitive content display control is enabled (act 902). The sensitive content display control can be enabled in response to a user request indicating to hide sensitive content. Additionally or alternatively, the sensitive content display control can be enabled in other manners, such as by default.

A person being present at the computing device display is identified (act 904). The person being present can be identified in various manners, such as the user coming close to (e.g., within 10 feet) of the computing device and looking at the computing device display, a user's hand being close to (e.g., within 2 feet) of the computing device, and so forth.

Whether the person present at the computing device display is an authorized user of the computing device is detected (act 906). This detection can be performed in various manners as discussed above, such as using biometric authentication.

Process 900 then proceeds based on whether the person present at the computing device display is an authorized user of the computing device (act 908). If the person present at the computing device display is not an authorized user of the computing device, then no content is displayed (act 910). No sensitive content is displayed. Furthermore, additional content (e.g., notifications that are not sensitive content) is also not displayed because the person is not an authorized user of the computing device.

However, if the person present at the computing device display is an authorized user of the computing device, then one or more sensors are activated (act 912). These sensors allow a determination to be made as to whether one or more additional people (one or more people in addition to the authorized user) are present at the computing device display, and optionally whether one or more additional people (one or more people in addition to the authorized user) are looking at the computing device display.

Whether one or more people additional people are looking at the computing device display is detected (act 914). If one or more additional people are not present at the computing device display, or one or more additional people are not looking at the computing device display, then one or more additional people are not looking at the computing device display. Otherwise, one or more additional people are detected as looking at the computing device display.

Process 900 then proceeds based on whether one or more additional people are detected as looking at the computing device display (act 916). If one or more additional people are detected as looking at the computing device display then sensitive content is hidden (act 918). Sensitive content is hidden, for example, by not displaying the sensitive content. However, if one or more additional people are not detected as looking at the computing device display then full content is displayed (act 920). Displaying full content includes displaying sensitive content.

It should be noted that process 900 is performed while the computing device is operating in a low power mode. For example, only a portion of the computing device display is powered on or activated, such as an area of the computing device display in which the sensitive content is displayed. Other portions of the computing device display need not be powered on or activated, thereby reducing power consumption in the computing device.

Figure 10:
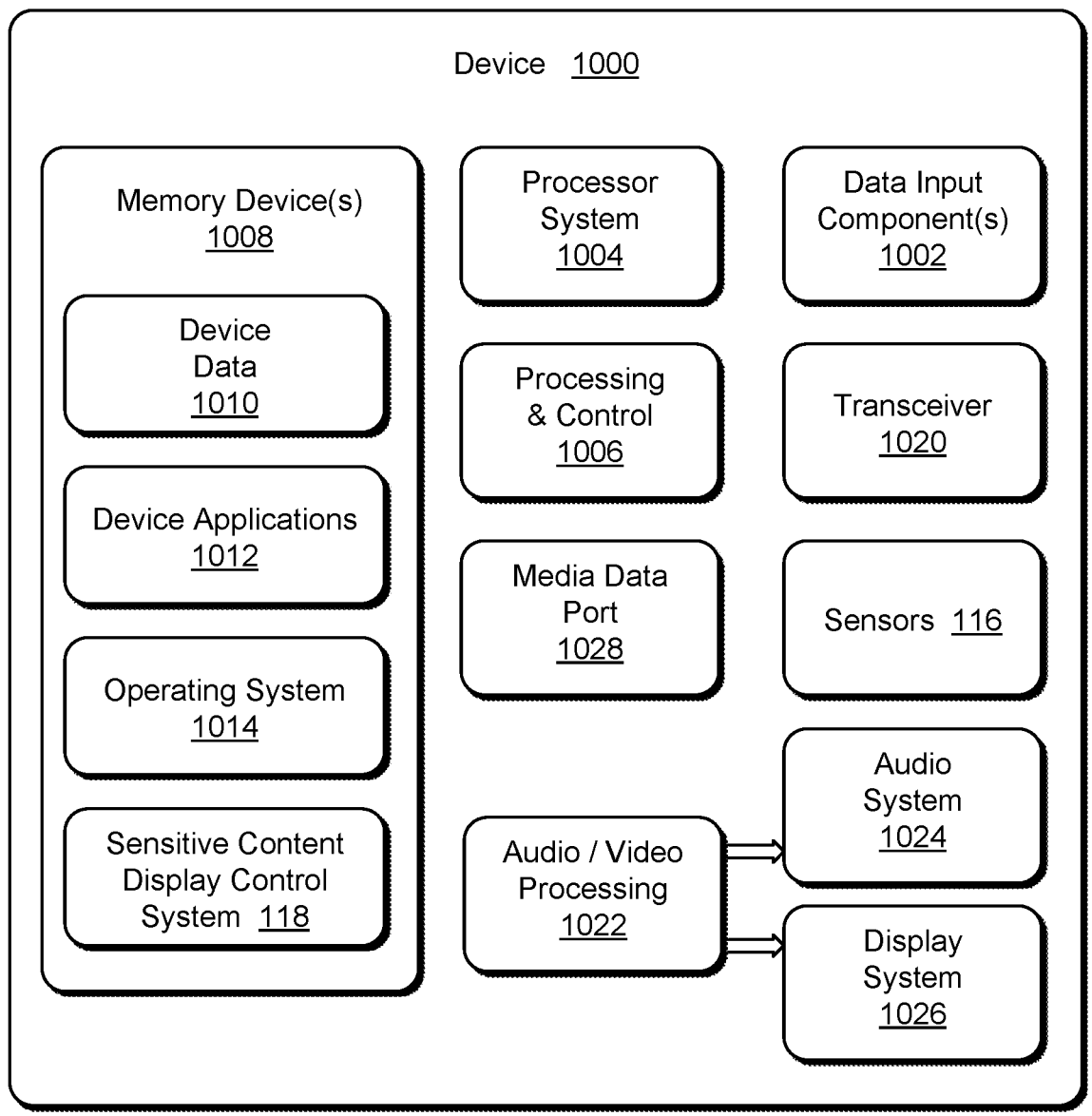
FIG. 10 illustrates various components of an example electronic device that can implement embodiments of the techniques discussed herein.

FIG. 10 illustrates various components of an example electronic device 1000 that can be implemented as a computing device as described with reference to any of the previous FIGS. 1-9. The device 1000 may be implemented as any one or combination of a fixed or mobile device in any form of a consumer, computer, portable, user, communication, phone, navigation, gaming, messaging, Web browsing, paging, media playback, or other type of electronic device.

The electronic device 1000 can include one or more data input components 1002 via which any type of data, media content, or inputs can be received such as user-selectable inputs, messages, music, television content, recorded video content, and any other type of audio, video, or image data received from any content or data source. The data input components 1002 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1002 may also include various other input components such as microphones, touch sensors, keyboards, and so forth.

The electronic device 1000 of this example includes a processor system 1004 (e.g., any of microprocessors, controllers, and the like) or a processor and memory system (e.g., implemented in a system on a chip), which processes computer executable instructions to control operation of the device 1000. A processor system 1004 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 1000 can be implemented with any one or combination of software, hardware, firmware, or fixed logic circuitry implemented in connection with processing and control circuits that are generally identified at 1006. Although not shown, the electronic device 1000 can include a system bus or data transfer system that couples the various components within the device 1000. A system bus can include any one or combination of different bus structures such as a memory bus or memory controller, a peripheral bus, a universal serial bus, or a processor or local bus that utilizes any of a variety of bus architectures.

The electronic device 1000 also includes one or more memory devices 1008 that enable data storage such as random access memory, nonvolatile memory (e.g., read only memory, flash memory, erasable programmable read only memory, electrically erasable programmable read only memory, etc.), and a disk storage device. A memory device 1008 provides data storage mechanisms to store the device data 1010, other types of information or data (e.g., data backed up from other devices), and various device applications 1012 (e.g., software applications). For example, an operating system 1014 can be maintained as software instructions with a memory device and executed by the processor system 1004.

In one or more embodiments the electronic device 1000 includes a sensitive content display control system 118 and one or more sensors 116, described above. Although represented as a software implementation, the sensitive content display control system 118 may be implemented as any form of a voice input interpretation application, module, firmware that is installed on the device 1000, a hardware implementation of the modules, and so on.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 1008.

The electronic device 1000 also includes a transceiver 1020 that supports wireless and/or wired communication with other devices or services allowing data and control information to be sent as well as received by the device 1000. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, and so forth.

The electronic device 1000 can also include an audio or video processing system 1022 that processes audio data or passes through the audio and video data to an audio system 1024 or to a display system 1026. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 1028. In implementations the audio system or the display system are external components to the electronic device. Alternatively or in addition, the display system can be an integrated component of the example electronic device, such as part of an integrated touch interface.

Although embodiments of techniques for implementing displaying sensitive content based on whether others are around user have been described in language specific to features or methods, the subject of the appended claims is not necessarily limited to the specific features or methods described. Rather, the specific features and methods are disclosed as example implementations of techniques for implementing displaying sensitive content based on whether others are around user, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method comprising: identifying that a person is present at a computing device display; detecting, in response to the person being present at the computing device display, whether the person is an authorized user of the computing device; determining, in response to the person being an authorized user of the computing device, whether one or more additional people are looking at the computing device display; and in response to one or more additional people looking at the computing device display, hiding sensitive content at the computing device.

Alternatively or in addition to the above described method, any one or combination of the following. The determining whether one or more additional people are looking at the computing device display comprising: determining whether one or more additional people are present at the computing device; and determining, in response to there being one or more additional people present at the computing device, whether at least one additional person is looking at the computing device display. The hiding sensitive content at the computing device comprising not displaying the sensitive content on the computing device display, the method further comprising displaying on the computing device display, in response to one or more additional people looking at the computing device and while the computing device is operating in the low power mode, an indication that sensitive content for display exists. The displaying the indication that sensitive content for display exists comprising displaying the indication on a lock screen of the computing device. The sensitive content comprising text notifications. Performing the identifying, the detecting, the determining, and the hiding only in response to a user input requesting that the computing device hide sensitive content. Subsequently determining that one or more additional people are not looking at the computing device display; and displaying, in response to one or more additional people not looking at the computing device display, sensitive content on the computing device display. The displaying the sensitive content comprising displaying the indication on a lock screen of the computing device. The detecting comprising receiving first authentication information from the user and detecting whether the person is an authorized user of the computing device using a first authentication mechanism and the first authentication information, the method further comprising: receiving second authentication information from the user; detecting, using a second authentication mechanism and the second authentication information, that the person is an authorized user of the computing device; unlocking the computing device in response to detecting, using the second authentication mechanism and the second authentication information, that the person is an authorized user of the computing device; and displaying the sensitive content on the computing device display while the computing device is unlocked. The first authentication information comprises a face image or an iris image; and the second authentication information comprises a fingerprint, a password, or a personal identification number. The detecting comprising receiving, while the computing device is operating in a low power mode, first authentication information from the user and detecting, while the computing device is operating in the low power mode, whether the person is an authorized user of the computing device using a first authentication mechanism and the first authentication information, the method further comprising: receiving, while the computing device is operating in the low power mode, second authentication information from the user; detecting, while the computing device is operating in the low power mode and using a second authentication mechanism and the second authentication information, that the person is an authorized user of the computing device; switching the computing device to a higher power mode in response to detecting, using the second authentication mechanism and the second authentication information, that the person is an authorized user of the computing device; and displaying the sensitive content on the computing device display while the computing device is operating in the higher power mode. The first authentication information comprises a face image or an iris image; and the second authentication information comprises a fingerprint, a password, or a personal identification number.

A computing device comprising: a computing device display; a processor; and a computer-readable storage medium having stored thereon multiple instructions that implement an unknown voice input interpretation system and that, responsive to execution by the processor, cause the processor to perform acts including: identifying, while the computing device is operating in a low power mode, that a person is looking at the computing device display; detecting, while the computing device is operating in the low power mode and in response to the person being present at the computing device display, whether the person is an authorized user of the computing device; determining, while the computing device is operating in the low power mode and in response to the person being an authorized user of the computing device, whether one or more additional people are looking at the computing device display; and hiding, in response to one or more additional people looking at the computing device display and while the computing device is operating in the low power mode, sensitive content at the computing device.

Alternatively or in addition to the above described method, any one or combination of the following. The detecting comprising receiving first authentication information from the user and detecting whether the person is an authorized user of the computing device using a first authentication mechanism and the first authentication information, the acts further comprising: receiving, while the computing device is operating in the low power mode, second authentication information from the user; detecting, while the computing device is operating in the low power mode and using a second authentication mechanism and the second authentication information, that the person is an authorized user of the computing device; switching the computing device to a higher power mode in response to detecting, using the second authentication mechanism and the second authentication information, that the person is an authorized user of the computing device; and displaying the sensitive content on the computing device display while the computing device is operating in the higher power mode. The hiding sensitive content at the computing device comprising not displaying the sensitive content on the computing device display, the acts further comprising displaying on the computing device display, in response to one or more additional people looking at the computing device and while the computing device is operating in the low power mode, an indication that sensitive content for display exists. The displaying the indication that sensitive content for display exists comprising displaying the indication on a lock screen of the computing device. The sensitive content comprising text notifications. Performing the identifying, the detecting, the determining, and the hiding only in response to a user input requesting that the computing device hide sensitive content. Subsequently determining that one or more additional people are not looking at the computing device display; and displaying, in response to one or more additional people not looking at the computing device display, sensitive content on the computing device display. The first authentication information comprises a face image or an iris image; and the second authentication information comprises a fingerprint, a password, or a personal identification number. The detecting comprising receiving first authentication information from the user and detecting whether the person is an authorized user of the computing device using a first authentication mechanism and the first authentication information, the method further comprising: receiving second authentication information from the user; detecting, using a second authentication mechanism and the second authentication information, that the person is an authorized user of the computing device; unlocking the computing device in response to detecting, using the second authentication mechanism and the second authentication information, that the person is an authorized user of the computing device; and displaying the sensitive content on the computing device display while the computing device is unlocked.

A sensitive content display control system comprising: a sensitive content settings module, implemented at least in part in hardware, configured to receive a user indication whether the sensitive content display control system is to hide sensitive content; a person presence detection module, implemented at least in part in hardware, configured to identify, while a computing device implementing the system is operating in a low power mode and in response to a user indication to hide sensitive content, that a person is present at a computing device display; a user recognition module, implemented at least in part in hardware, configured to detect, while the computing device is operating in the low power mode and in response to both the person being present at the computing device display and the user indication to hide sensitive content, whether the person is an authorized user of the computing device; an additional people presence detection module, implemented at least in part in hardware, configured to determine, while the computing device is operating in the low power mode and in response to both the person being an authorized user of the computing device and the user indication to hide sensitive content, whether one or more additional people are looking at the computing device display; and a content display control module, implemented at least in part in hardware, configured to hide, while the computing device is operating in the low power mode and in response to both one or more additional people looking at the computing device display and the user indication to hide sensitive content, sensitive content at the computing device.

Alternatively or in addition to the above described method, any one or combination of the following. The content display control module is further configured to: subsequently determine that one or more additional people are not looking at the computing device display; and display, in response to one or more additional people not looking at the computing device display, sensitive content on the computing device display. Wherein the content display control module is configured to hide sensitive content at the computing device by not displaying the sensitive content on the computing device display, and to display on the computing device display, in response to one or more additional people looking at the computing device display and while the computing device is operating in the low power mode, an indication that sensitive content for display exists. Wherein the content display control module is configured to display the indication that sensitive content for display exists on a lock screen of the computing device.

What is claimed is:

1. A method comprising:
    identifying that a person is present at a computing device;
    detecting, in response to the person being present at the computing device and while the computing device is implementing a power conserving technique to activate pixels in only a portion of a display of the computing device, that the person is an authorized user of the computing device, the computing device continuing to implement the power conserving technique after the person is detected as the authorized user;
    determining, in response to the person being the authorized user of the computing device and while the computing device is implementing the power conserving technique, whether one or more additional people are looking at the display of the computing device; and
    in response to one or more additional people looking at the display of the computing device and while the computing device is implementing the power conserving technique, hiding sensitive content at the computing device.

2. The method of claim 1, the determining whether one or more additional people are looking at the display of the computing device comprising:
    determining whether one or more additional people are present at the computing device; and
    determining, in response to there being one or more additional people present at the computing device, whether at least one additional person is looking at the display of the computing device.

3. The method of claim 1, the hiding sensitive content at the computing device comprising not displaying the sensitive content on the display of the computing device, the method further comprising displaying on the display of the computing device, in response to one or more additional people looking at the display of the computing device and while the computing device is implementing the power conserving technique, an indication that sensitive content for display exists.

4. The method of claim 3, the displaying the indication that sensitive content for display exists comprising displaying the indication on a lock screen of the computing device.

5. The method of claim 1, the sensitive content comprising text notifications.

6. The method of claim 1, further comprising performing the identifying, the detecting, the determining, and the hiding only in response to a user input requesting that the computing device hide sensitive content.

7. The method of claim 1, the method further comprising:
    subsequently determining, while the computing device is implementing the power conserving technique, that one or more additional people are not looking at the display of the computing device; and
    displaying, in response to one or more additional people not looking at the display of the computing device and while the computing device is implementing the power conserving technique, sensitive content on the display of the computing device.

8. The method of claim 7, the displaying the sensitive content comprising displaying the sensitive content on a lock screen of the computing device.

9. The method of claim 1, the detecting comprising receiving first authentication information from the person and detecting whether the person is an authorized user of the computing device using a first authentication mechanism and the first authentication information, the method further comprising:
    receiving second authentication information from the person;
    detecting, using a second authentication mechanism and the second authentication information, that the person is an authorized user of the computing device;
    unlocking the computing device in response to detecting, using the second authentication mechanism and the second authentication information, that the person is an authorized user of the computing device; and
    displaying the sensitive content on the display of the computing device while the computing device is unlocked.

10. The method of claim 9, wherein:
    the first authentication information comprises a face image or an iris image; and
    the second authentication information comprises a fingerprint, a password, or a personal identification number.

11. The method of claim 1, the detecting comprising receiving, while the computing device is implementing the power conserving technique, first authentication information from the person and detecting, while the computing device is implementing the power conserving technique, whether the person is an authorized user of the computing device using a first authentication mechanism and the first authentication information, the method further comprising:
    receiving, while the computing device is implementing the power conserving technique, second authentication information from the person;
    detecting, while the computing device is implementing the power conserving technique and using a second authentication mechanism and the second authentication information, that the person is an authorized user of the computing device;
    reversing the power conserving technique to activate all pixels of the display in response to detecting, using the second authentication mechanism and the second authentication information, that the person is an authorized user of the computing device; and
    displaying the sensitive content on the display of the computing device while all pixels of the display are activated.

12. The method of claim 11, wherein:
    the first authentication information comprises a face image or an iris image; and
    the second authentication information comprises a fingerprint, a password, or a personal identification number.

13. A computing device comprising:
    a display;
    a processor; and
    a computer-readable medium having stored thereon multiple instructions which, when executed by the processor, cause the processor to perform operations including:
        identifying that a person is present at the computing device;
        detecting, in response to the person being present at the computing device and while the computing device is implementing a power conserving technique to activate pixels in only a portion of the display, that the person is an authorized user of the computing device, the computing device continuing to implement the power conserving technique after the person is detected as the authorized user;

determining, in response to the person being the authorized user of the computing device and while the computing device is implementing the power conserving technique, whether one or more additional people are looking at the display of the computing device; and hiding, in response to one or more additional people looking at the display of the computing device and while the computing device is implementing the power conserving technique, sensitive content at the computing device.

14. The computing device of claim 13, the detecting comprising receiving first authentication information from the person and detecting whether the person is an authorized user of the computing device using a first authentication mechanism and the first authentication information, the operations further including:

receiving, while the computing device is implementing the power conserving technique, second authentication information from the person;

detecting, while the computing device is implementing the power conserving technique and using a second authentication mechanism and the second authentication information, that the person is an authorized user of the computing device;

reversing the power conserving technique to activate all pixels of the display in response to detecting, using the second authentication mechanism and the second authentication information, that the person is an authorized user of the computing device; and displaying the sensitive content on the display while all pixels of the display are activated.

15. The computing device of claim 14, the operations further comprising:

unlocking the computing device in response to detecting, using the second authentication mechanism and the second authentication information, that the person is an authorized user of the computing device; and displaying the sensitive content on the display while the computing device is unlocked.

16. The computing device of claim 14, wherein:

the first authentication information comprises a face image or an iris image; and the second authentication information comprises a fingerprint, a password, or a personal identification number.

17. The computing device of claim 13, the hiding sensitive content at the computing device comprising not displaying the sensitive content on the display, the operations further comprising displaying on the display, in response to one or more additional people looking at the display and while the computing device is implementing the power conserving technique, an indication that sensitive content for display exists.

18. The computing device of claim 17, wherein the displaying the indication that sensitive content for display exists comprising displaying the indication on a lock screen of the computing device.

19. The computing device of claim 13, the operations further comprising:

subsequently determining, while the computing device is implementing the power conserving technique, that one or more additional people are not looking at the display; and displaying, in response to one or more additional people not looking at the display and while the computing device is implementing the power conserving technique, sensitive content on the computing device.

20. A sensitive content display control system comprising:

a person presence detection module, implemented at least in part in hardware, configured to identify that a person is present at a computing device;

a user recognition module, implemented at least in part in hardware, configured to detect, in response to the person being present at the computing device and while the computing device is implementing a power conserving technique to activate pixels in only a portion of a display of the computing device, that the person is an authorized user of the computing device, the computing device continuing to implement the power conserving technique after the person is detected as the authorized user;

an additional people presence detection module, implemented at least in part in hardware, configured to determine, in response to the person being the authorized user of the computing device and while the computing device is implementing the power conserving technique, whether one or more additional people are looking at the display of the computing device; and a content display control module, implemented at least in part in hardware, configured to hide, in response to one or more additional people looking at the display of the computing device and while the computing device is implementing the power conserving technique, sensitive content at the computing device.

* * * * *